May 29, 1934. S. J. PENTLER ET AL 1,960,792
COMPOSITE INSOLE
Filed Oct. 29, 1932  2 Sheets-Sheet 1
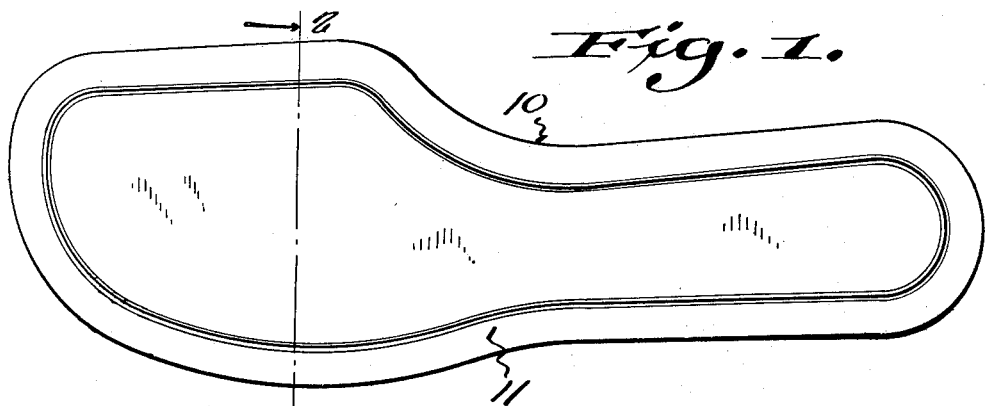
Fig. 1.
Fig. 2.
Fig. 3.
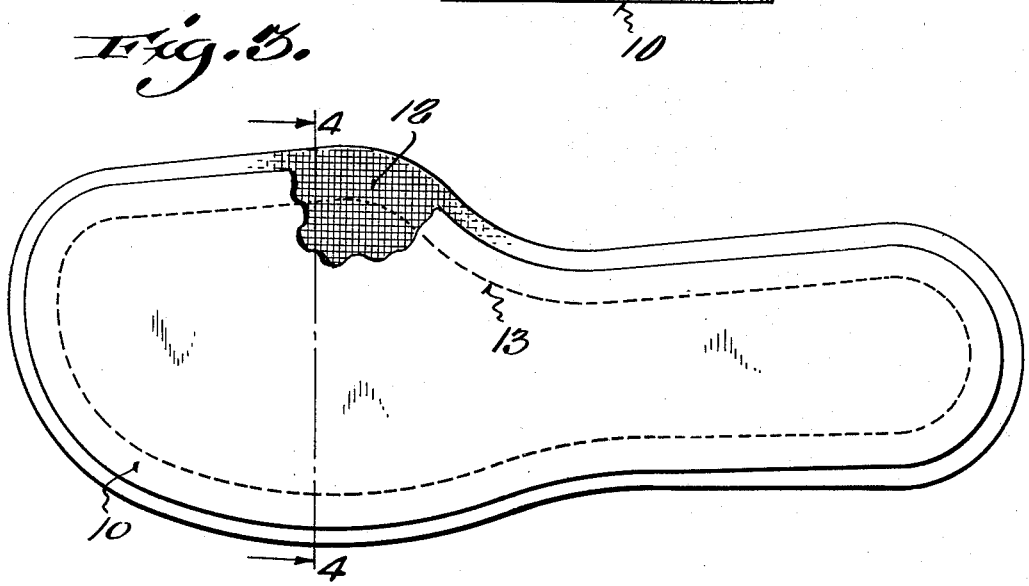
Fig. 4.
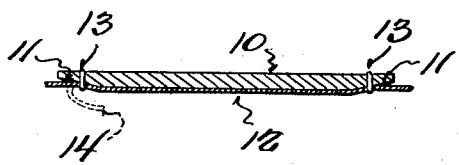
Inventors,
Sigmund J. Pentler
Otto R. Short
By Young & Young
Attorneys May 29, 1934.  S. J. PENTLER ET AL  1,960,792
COMPOSITE INSOLE
Filed Oct. 29, 1932   2 Sheets-Sheet 2
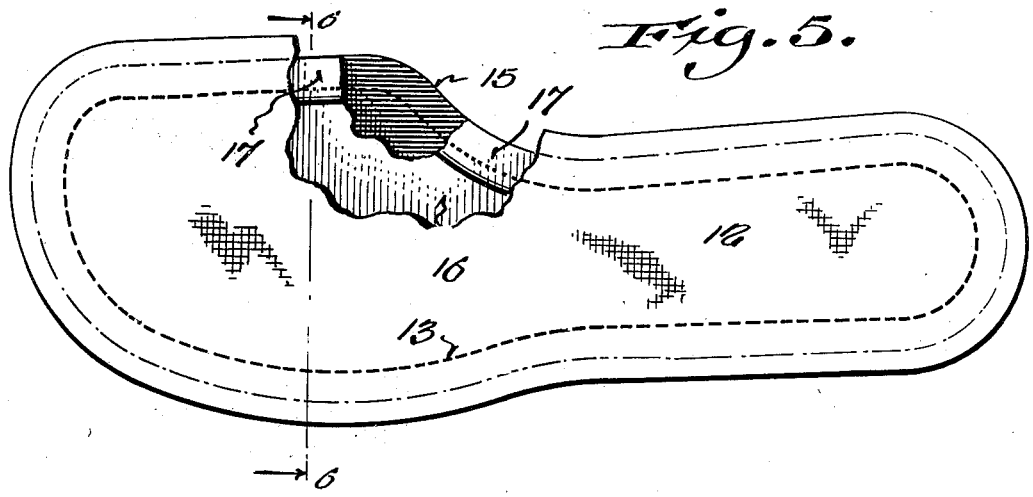
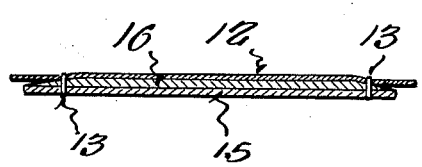 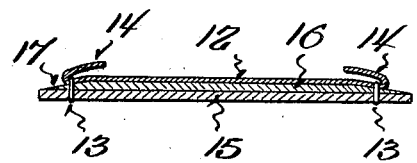
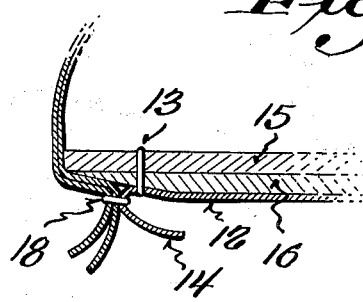

Patented May 29, 1934

1,960,792

UNITED STATES PATENT OFFICE 1,960,792

COMPOSITE INSOLE

Sigmund J. Pentler and Otto R. Short, Wausau, Wis.

Application October 29, 1932, Serial No. 640,182

5 Claims. (Cl. 36—22)

This invention pertains to insoles, and more particularly to what may be termed "composite insoles," formed from two or more pieces of material, for use in connection with inseamed shoes.

Practically all leather insoles now in use for inseamed shoes are either shouldered and channeled outwardly, to provide an inwardly spaced peripheral inseam lip to which the upper is stitched, or in insoles used in what is termed the "Economy process," the same are split along the marginal edge, and the bottom layer then turned up and cemented to the inner lip, after which the lip is reenforced with a duck covering. It is therefore necessary to utilize a comparatively heavy, thick piece of leather for the insole, to give sufficient body to the lip and provide the necessary depth of shoulder against which to hold the work during the inseaming operation.

Although attempts have been made to form an insole by stitching a strip to a blank of leather, or other material, to provide an inseam lip, and at the same time form a shoulder, this has proved to be impractical, inasmuch as the inseam needle invariably cuts or mutilates the stitches that hold the lip, which results in the insole becoming loose during manufacture, or subsequent wear.

Factories manufacturing inseamed shoes usually have a large quantity of leather on hand taken from the thinner parts of the hides, which is too light to be practical for a channeled insole. Therefore, this material must be disposed of at a considerable loss.

It is therefore primarily the object of the present invention to provide an insole for inseamed shoes, utilizing extremely thin leather, heretofore discarded, or any other suitable inexpensive material, such as imitation leather, composition, and the like, and which at the same time includes all of the most desirable features in an insole, such as a peripheral lip of desired rigidity and strength, and sufficient shoulder against which to hold the work during the inseaming operation.

Incidental to the foregoing a more specific object resides in the provision of an insole comprising a relatively thin piece of material, such as leather, or the like, having a piece of fabric, or any other light, inexpensive material, stitched thereto and turned back upon itself to form a peripheral shoulder and lip.

A more detailed object in connection with the foregoing resides in utilizing a fabric covering, such as duck, and treating the same with wax, or any other similar material, which is pliable and at the same time adds rigidity to the fabric, so that the same will retain its shape, particularly during the inseaming operation.

A still further object resides in the provision of an insole comprising two layers of material secured together, and a fabric, or other light, inexpensive, flexible covering, stitched to both pieces, or merely to the outer piece, thus serving to form a retaining pocket for the intermediate piece, all of which permits extremely light leather, or other inexpensive material, to be utilized, and also enables one to produce a highly desirable cushion insole, as will be later described more in detail.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:—

Figure 1 is a bottom plan view illustrating a body blank to be used in connection with the present invention.

Figure 2 is a transverse section taken on the line 2—2 of Figure 1.

Figure 3 is a top plan view of the insole after attaching the fabric, or other covering material.

Figure 4 is a transverse section taken on the line 4—4 of Figure 3.

Figure 5 is a bottom plan view of a modified form of the invention, with parts broken away and in section.

Figure 6 is a transverse section taken on the line 6—6 of Figure 5.

Figure 7 is a similar section showing the inseam lip formed in the covering material, and Figure 8 is an enlarged fragmentary section illustrating the upper inseamed to the lip of the insole.

Referring now more particularly to the accompanying drawings, that form of the invention illustrated in Figures 1 to 4 inclusive comprises a single body blank of leather, or similar material, such as imitation leather, composition, or the like, designated by the numeral 10, and cut to shape to fit the desired last. The marginal edge of the blank is then beveled at 11 to provide a relatively thin edge, the beveled face serving an additional purpose in conjunction with the covering to be attached, as will be hereinafter described in further detail.

The next step in forming the insole is to attach a relatively thin, flexible covering 12 to that surface of the blank 10 provided with a marginal, beveled face. As best shown in Figures 3 and 4, the covering 12 is attached by a line of stitching 13, which passes through the beveled face intermediate its marginal edges, thus positioning the stitches above the lower surface of the covering, as best shown in Figure 4, and inwardly from the marginal edge of the blank 10. The peripheral edge of the covering 12 is then folded inwardly upon itself, as indicated in dotted lines in Figure 4, to provide an inseam lip 14.

As set forth in the objects, the present invention is designed to permit the use of relatively thin leather, which has heretofore been waste, or other inexpensive material, and this is accomplished inasmuch as the inseam lip is formed out of the covering rather than from the material itself in the usual manner. It will also be readily seen that in turning the covering back upon itself, a shoulder is formed in conjunction with the beveled face 11, against which the upper can be held during the inseaming operation. Therefore, in view of the fact that it is unnecessary to form either the shoulder or inseam lip in the blank, it will be quite apparent that an extremely thin, light material can be employed.

In order to permit the forming of the inseam lip, and for the purpose of economy, the covering 12 must be formed from relatively light, flexible, and inexpensive material, and while the invention is not to be limited, it has been found that duck fabric best serves the purpose. However, duck fabric, or whatever material is employed, due to its necessary softness, will not retain a definite shape, or form, and, therefore, difficulties are encountered in the inseaming operation. To overcome the foregoing, it is proposed to treat the covering with a pliable stiffening material, which permits the covering to be readily shaped and still retain its form. Various materials may be employed. However, wax, or paraffin composition, has been found the most desirable, in that it will not crack during the shaping of the fabric or covering, and at the same time sufficient rigidity is imparted to the fabric to maintain its shape. Furthermore, the wax, or paraffin, which coats and impregnates the cover, serves as a water-proof coating and preservative for the same.

The modification illustrated in Figures 5 to 8, inclusive, differs from the form heretofore described only in that two layers of material are used in place of the single body blank 10. For the purpose of explanation, the layer designated by the numeral 15 will be termed the "outer layer," while the adjacent layer 16 will be referred to as the "intermediate layer."

While the layers 15 and 16 may be secured together in various ways, it is preferred to utilize a suitable cement or adhesive. After the layers are attached, the intermediate layer 16 is provided with a marginal bevel 17, which may be obtained by skiving, or in any other suitable manner. The covering 12 is then attached by a line of stitching 13 which passes through the beveled face 17 intermediate its marginal edges, after which the inseam lip 14 is formed in the manner heretofore described.

Figure 8, which is an exaggered detail section, illustrates the lining and upper inseamed to the lip 14 by the stitches 18, and here it will be noted that the inseam stitches 18 pass through the lip 14 below the stitches 13. Thus, during the inseaming operation, the inseaming needle does not come into contact with the stitches 13, which eliminates breaking or mutilating the stitches 13. This is made possible by the fact that the stitches 13 pass through the beveled portion of the layer, and are therefore positioned in a plane above the plane of the lower face of the covering, which is engaged by the needle guide during the inseaming operation.

In instances where it is desired to provide a cushion insole, the intermediate layer 16 can be formed from a suitable cushion material, such as felt, cotton, cork, rubber, etc., and inasmuch as the same is covered by the outer layer 15, and away from the foot, an exceedingly smooth, yet resilient structure results.

From the foregoing explanation, considered in connection with the accompanying drawings, it is to be readily seen that an extremely simple, inexpensive, and durable insole has been provided, which presents all of the desirable features and advantages present in accepted types of insoles now in use, and at the same time utilizes extremely inexpensive material.

The two forms of the invention differ only in that in one instance a single body blank is employed, while, in the other, two layers of material are cemented together to form the body. Obviously, in the second instance, much lighter material can be employed, and, if desired, a cushion insole can be provided, while in the first instance, where merely a single layer is utilized, an ultimately lighter sole with greater flexibility is obtained.

In addition to the foregoing, it will be noted that regardless of whether or not the line of stitching 13 passes through the intermediate strip 16, the same is always secured to the outer layer 15, thus forming a pocket, which serves to retain the intermediate strip 16. In view of the foregoing, should it occur that the skiving operation cuts off the intermediate strip, interiorly of the line of stitching 13, the same will always be held securely in place by the marginal stitching 13.

Also, in view of the fact that the inseam lip is formed from extremely light, thin material, the same is readily flattened upon the covering 12 after the inseaming operation, taking up practically no space, thus eliminating the necessity of a filler.

We claim:—

1. A composite insole comprising a body blank beveled around its peripheral edge, and a relatively thin flexible covering stitched to said beveled face and having its peripheral edge folded inwardly upon itself to form an inseam lip and a shoulder adjacent the edge of said blank.

2. A composite insole comprising a body blank beveled around its peripheral edge, and a relatively thin flexible covering stitched to said beveled face and having its peripheral edge folded inwardly upon itself to form an inseam lip and a shoulder adjacent the edge of said blank, said covering being impregnated with a pliable stiffening material.

3. A composite insole comprising a body blank having its peripheral edge beveled, and a fabric covering stitched to said beveled face intermediate its marginal edges and having its peripheral edge folded inwardly upon itself to form an inseam lip and a shoulder adjacent the edge of said body, said fabric being impregnated with a pliable stiffening material.

4. A composite insole comprising two layers of material cemented together to form a body, the marginal edge of one of said layers being beveled, and a relatively thin flexible covering attached to the beveled layer by stitches passing through its beveled surface intermediate the marginal edges thereof, said covering being impregnated with a pliable stiffening material and having its peripheral edge folded inwardly upon itself to form an inseam lip and a marginal shoulder in conjunction with the beveled face of said layer.

5. A composite insole comprising two layers of material cemented together to form a body, one of said layers being formed from resilient cushioning material, the marginal edge of said resilient layer being beveled, and a relatively thin flexible covering attached to said body by stitches passing through the beveled surface of said resilient layer, said covering being impregnated with a pliable stiffening material and having its peripheral edge folded inwardly upon itself to form an inseam lip and a marginal shoulder in connection with the beveled face of said resilient layer.

SIGMUND J. PENTLER.
OTTO R. SHORT.